United States Patent Office 2,864,690
Patented Dec. 16, 1958

2,864,690

PROCESS FOR TREATING TITANIUM METAL

Robert P. Lee, Red Bank, and Harry G. Rodman, Matawan, N. J., assignors to National Lead Company, New York, N. Y., a corporation of New Jersey No Drawing. Application March 8, 1955
Serial No. 493,067

8 Claims. (Cl. 75—84.4)

This invention relates in general to the treatment of refractory metal and in particular to a method for leaching impure titanium metal. Still more specifically the invention relates to an improved method for removing from titanium metal contaminants which may be present or which may be formed as by-products in the titanium metal during the production thereof such as, for example, magnesium metal and/or various water soluble or acid soluble compounds such as magnesium chloride and the like; the instant application being a continuation-in-part of our applications Serial No. 365,776, Serial No. 365,777 and Serial No. 365,778, all of which were filed July 2, 1953 and expressly abandoned on April 27, 1955.

When titanium metal is produced by a process such as that described, for example in U. S. Patent No. 2,205,854 wherein titanium tetrachloride and an active reducing metal such as magnesium metal are reacted at elevated temperatures to form titanium metal and a chloride salt of the reducing metal, the crude titanium metal which is formed is usually contaminated with by-products such as, for example, the chloride salt of the reducing metal and the reducing metal itself. Before the crude titanium metal can be further utilized in the various commercial applications for which it may be suitable, it is necessary for such contaminant or by-products to be separated from the titanium metal by means of a leaching operation. In removing such contaminants, the titanium metal is first subdivided and then leached with water or a dilute acid solution as the leaching medium. It is possible through the employment of proper water leaching procedures to effectively remove substantially all of the water soluble impurities such as for example, magnesium chloride, and by employing a dilute acid in the leaching step it is further possible to remove the metallic impurities such as magnesium metal as well as the soluble salt-like compounds. Because of the economics involved it has generally been the practice to use an acidic solution of for example, hydrochloric or dilute sulphuric acid in such leaching operations. However, in subsequent methods of processing and in particular the step of melting the leached titanium metal by for example, an arc melting operation in order to cast it into suitable forms for commercial utilization, it has been observed that often undesirable difficulties have been encountered, and that for some reason the titanium metal product is not amenable to arc melting procedures. The reason for this are not clear; however, it is possible that after the dilute acid leaching operation the titanium metal product may contain some absorbed gas such as for example, hydrogen, and that the absorbed gaseous material is released during the subsequent arc melting operation. Such action results in the loss of arc stability and in the spattering of metal which is observed and which does not permit a satisfactory arc melting operation to be obtained.

Accordingly, an object of this invention is to provide a satisfactory method for removing by-products from impure titanium metal. Another object is to provide a method for rendering said titanium metal amenable to a subsequent arc melting operation. Another object is to provide a method for separating contaminant from titanium metal by a leaching operation. A further object is to provide a method for removing contaminant and for rendering titanium metal amenable to an arc melting procedure, said method being simple and economical to employ. These and other objectives will become apparent from the following more complete description of the instant invention.

In its broadest aspects the instant invention relates to a method for removing the reaction by-products from crude titanium metal to render said metal amenable to arc melting which comprises leaching said crude titanium metal with an inorganic oxidizing acid solution. It has been found that leaching sub-divided crude titanium metal, produced by reduction of its halide and containing reaction by-products, with an oxidizing acid solution according to the instant invention prevents hydrogen from being absorbed into the metal during leaching thereby producing a superior type of ductile titanium metal. Substantially any inorganic oxidizing acid in aqueous solution which is capable of oxidizing hydrogen gas to hydrogen ion in an acid solution may be successfully employed. Among the oxidizing agents which have been successfully used are nitric acid and acid solutions of nitrate salts, ferric salts, $Na_2CrO_4$, $K_2Cr_2O_7$, $KMnO_4$, $H_2O_2$, $NaClO_3$, $NaClO$, $NaClO_4$, $KBrO_3$, $KIO_3$, $TiCl_4$, $MnO_2$, $PbO_2$, $SnCl_4$, $CuSO_4$, and oxidizing gases such as chlorine, oxygen, ozone and bromine.

In carrying out the instant invention the oxidizing agent is usually dissolved in an acidic solution. Some of these agents, however, are only very slightly soluble, particularly gases such as oxygen, and ozone. In these instances it is desirable to add these gases by bubbling them through the solution during the leaching operation. In the case of chlorine and other gases the gas may be bubbled through the solution or formed in situ in some manner in the solution itself. Since some of the salts used as oxidizing agents are only slightly soluble in the acid solution, it is desirable although not essential to control the rate of addition of either the oxidizing agent or the acid portion of the solution.

It is obvious that the specific quantities of oxidizing agents to be employed in any particular operation will depend upon a variety of factors such as for example, the type of oxidizing agent to be employed, the amount of contamination which may be present, the physical form of the titanium metal product to be purified and other operational variations.

Preferably sufficient oxidizing agent should be present in the leaching solution to react with at least a major portion of the hydrogen which theoretically would be released if the oxidizing agent were not employed in the leaching solution. An excess over this amount may be employed to insure superior results. In most cases it has been found that satisfactory results are obtained when at least 0.5% of an oxidizing agent up to the maximum solubility, based on the weight of the leaching solution, is employed. Preferably from about 0.5% to about 20% of an oxidizing agent should be employed and in the case of $HNO_3$ amounts as high as 70% may be employed.

Typical of a leaching solution comprising an acid and an inorganic oxidizing agent is a ferric iron containing acidic solution consisting essentially of a mineral acid such as hydrochloric acid or sulfuric acid and a ferric compound such as ferric chloride. Other ferric solutions of mineral acids which have been found particularly suitable for employment according to the instant invention include ferric sulfate, ferric nitrate, ferric phosphate, ferric ammonium sulfate and the like. For satisfactory operations it has been found that it is preferably to employ from about 2.0% to maximum solubility of the ferric compound, and preferably from about 2% to about 20%.

One of the preferred embodiments of the instant invention is to employ a "nitrate-containing" acidic solution as the leaching agent. The term "nitrate-containing" herein employed is used in the obvious sense to include solutions which contain the $NO_3$ grouping such as nitric acid, sodium nitrate, potassium nitrate and the like. The solution may of course be nitric acid alone or any acidic solution containing nitrate compounds. Any nitrate-containing solution sufficiently acidic to attack for example, magnesium metal, may be suitably employed. Obviously a solution of nitric acid is sufficiently acidic in its own right; however an aqueous solution of sodium nitrate is usually considered to be neutral, and thus it would be necessary in addition to have present an acidic material such as hydrochloric acid, sulphuric acid, acetic acid, or some salt such as magnesium chloride which forms an acceptable acidic solution, capable of dissolving metallic magnesium. It is to be appreciated that mineral and organic acids other than those above mentioned may also be employed.

According to a preferred embodiment of the instant invention the amount of nitrate compound which is employed may vary considerably. For the most efficient operation using nitrates as the oxidizing agent it has been found that it is desirable to use from about 2% to maximum solubility of the nitrate compound and preferably from 2% to 20% of nitrate compound calculated on an $NO_3$ basis, although the maximum amount will be limited by the solubility content.

Any leaching solution having the required oxidizing characteristics and sufficiently acidic to attack magnesium metal, may be suitably employed. Preferably, solutions of mineral acids such as nitric acid, hydrochloric acid and sulphuric acid are used in the leaching medium. Likewise, solutions containing other materials such as magnesium chloride and the like which are also sufficiently acidic to attack the metallic contaminant may be included.

The concentration of the acidic solution which is employed may vary over a considerable range. However, for reasons of economy and ease of operation it has been found desirable to employ solutions which are dilute with respect to the presence of acidic constituents. For example, leaching solutions containing from about 2% to about 20% HCl have been successfully employed. Chemical equivalent amounts for the other acids may also be employed successfully. When using some of the oxidizing agents, however, it has been found that concentrations other than those recited are more effective. Obviously highly concentrated acids should be avoided for reasons of economy and to avoid other detrimental effects, e. g. when using concentrated $H_2SO_4$ and HCl, the acid readily attacks the titanium metal itself.

It has been found however that when nitric acid is used alone as the oxidizing agent that the corrosion effects including the effect on the titanium metal itself are of much less importance, therefore nitric acid solutions up to 70% concentration by weight of $HNO_3$ may be advantageously employed and it has been in fact discovered that such concentrated solutions particularly when employed at elevated temperatures result in effective suppression of hydrogen absorption by the metal. Employment of solutions containing less than 2% nitric acid will not provide sufficient leaching action within a reasonable time to be economically feasible. Therefore, the preferred range of concentration for nitric acid solutions to obtain the objectives of the invention is from about 2% to about 70% concentration by weight of $HNO_3$.

Using highly concentrated nitric acid has little corrosion effect on the titanium metal product. The actual loss by dissolution is immaterial in the process. The concentrated nitric acid has the advantage that the magnesium content of the impure sponge may be more readily and quickly dissolved and the evolved hydrogen more efficiently taken care of. It is apparently helpful to provide sufficient reacting ions in the solution to render the hydrogen innocuous so that it cannot enter or combine with the titanium metal product. In the case of acid solutions containing nitrate salts the concentration which may be successfully employed is often limited by the solubilities of the salts and by the practical aspects of corrosion effects on the tanks and apparatus employed.

The combination of various acids and oxidizing agents is effective in producing results in accordance with the objects of this invention. Under certain circumstances combinations of certain acids and salts may be considerably cheaper than the use of relatively expensive nitric acid alone, and may be more available and more conveniently handled in plant practice. In either case the titanium metal produced as amenable to arc melting and selection of the particular reagents employed will depend upon conditions. It is obvious that the specific quantity of agents to be employed in any particular operation will depend upon a variety of factors such as for example, the amount of contamination which may be present, the physical form of the titanium metal product to be purified, the size of the equipment, etc.

The reason why the presence of an oxidizing agent in the acid leaching solution results in an improved titanium metal product with respect to subsequent processing operations is not presently clear. It is postulated that the oxidizing agent reacts with hydrogen gas which may be evolved during the leaching operation and thereby prevents such gaseous material from being absorbed by the titanium product, or it may be that the oxidizing agent itself is reduced in preference to hydrogen and that its reduced products are not absorbed or occluded by the titanium metal.

The leaching operation may be conducted over a rather wide temperature range. For effective removal of the impurities it has been found suitable under most conditions to initiate the leaching operation at essentially room temperature. Normally an evolution of heat will accompany the leaching operation, but the resulting temperature increase appears to produce no ill effects.

In order to illustrate the instant invention more clearly, the following examples are presented:

*Example 1*

70 parts of a sample of coarse titanium metal which was prepared by the reaction between titanium tetrachloride and molten magnesium metal by a process similar to that disclosed by Kroll in U. S. Patent No. 2,205,854 for producing titanium metal and which was contaminated with a quantity of magnesium metal and magnesium chloride were subjected to a leaching operation. 1460 parts of an acidic solution containing 44 parts $H_2SO_4$ and 292 parts $NaClO_3$ were employed as the leaching medium. These amounts correspond to a concentration of 3% $H_2SO_4$ and 20% $NaClO_3$. The acid was added slowly during the first one-half hour of the leaching operation. The leaching operation was continued for a period of four hours at temperatures of between about 24° C. and 47° C. At the end of the leaching period the titanium metal was removed from the acid leaching solution containing the $NaClO_3$ and was washed with water and dried for a period of about three hours at a temperature of about 150° C. Substantially all of the magnesium and magnesium chloride were removed by this operation. After the contaminants had been removed and the product dried, the titanium metal product was then transferred to an arc melting apparatus and melted, and the molten titanium was subsequently cast into ingot form. The titanium metal ingot possessed a Brinell hardness number of 220. During the arc melting operation there was no difficulty in maintaining a stable arc, and there was practically no spattering of the titanium metal as it was being melted.

Example 2

The same amount of another portion of the impure titanium metal employed in Example 1 was subjected to another acidic leaching operation in order to remove contaminating magnesium metal and magnesium chloride. The acidic leaching solution in this example consisted of 1500 parts of solution containing 150 parts $H_2SO_4$ and 150 parts $KMnO_4$. The leaching operation was continued for a period of four hours at temperatures of between about 34° C. and about 44° C. The leaching operation and subsequent are melting and casting steps were conducted in the manner described in the preceding example. Once again no difficulty was experienced during the arc melting step, and the cast ingot had a Brinell hardness number of 140.

Example 3

Still another portion of the impure titanium metal employed in the preceding examples was subjected to a leaching operation in order to remove the contaminating magnesium metal and magnesium chloride. This time the leaching solution consisted of 1450 parts of a solution containing 70 parts of $H_2SO_4$ and 140 parts of $H_2O_2$. The separated titanium metal product was subsequently washed and dried and was then processed by an arc melting operation. The titanium metal ingot which was formed possessed a Brinell hardness of 210.

Example 4

The process described in Example 1 was repeated except 1500 parts of solution containing 45 parts of HCl and 45 parts of $K_2Cr_2O_7$ were used. Again the titanium metal was arc melted satisfactorily.

Example 5

Another portion of an impure titanium metal of the type used in the preceding examples was treated as described in Example 1 except 1600 parts of a solution containing 180 parts of $TiCl_4$ were used. Again the contaminants were removed, and satisfactory arc melting was realized. The ingot produced had a Brinell hardness of 140.

Example 6

The process described in Example 1 was repeated except 1400 parts of a solution containing 140 parts of $H_2SO_4$ and 84 parts of $KIO_3$ were employed. The results obtained were similar to those previously described, and ingot Brinell hardness was 137.

Example 7

Another portion of impure titanium metal of the type used in the preceding examples was treated as described in Example 1 except 1200 parts of a solution containing 36 parts of HCl and 180 parts of $SnCl_4$ were employed. The titanium metal surface was coated with a deposit which was subsequently easily removed by leaching in dilute acid. The titanium metal was then arc melted satisfactorily.

Example 8

Another portion of impure titanium metal was placed in 900 parts water and chlorine gas was bubbled through the solution. The treated titanium metal was then arc melted satisfactorily.

Example 9

The same procedure as that described in Example 8 was employed except that oxygen was bubbled through the solution in place of the chlorine gas, and 28 parts of HCl were added to the solution during the first hour of the operation.

Example 10

The process described in Example 1 was repeated except 1500 parts of an acidic solution which contained 150 parts HCl and 117 parts $NaNO_3$ were employed in this operation. These amounts represent about 10% HCl and about 5.7% $HNO_3$. The leaching was continued for a period of 4 hours at temperatures generally between 20° C. and 60° C. At the end of this time the titanium metal was removed from the acidic leaching solution, washed with water and finally dried for a period of three hours at a temperature of about 150° C. The results obtained were similar to those previously described and satisfactory arc melting was realized.

Example 11

70 parts of a sample of titanium metal such as described in Example 1 were likewise subjected to a leaching operation in which an acidic leaching solution was employed. 1500 parts of the acidic leaching solution containing 300 parts $H_2SO_4$ and 225 parts $NaNO_3$ were used for this operation. These amounts represent approximately 20% $H_2SO_4$ and about 14% $NaNO_3$. The leaching operation and subsequent arc melting and ingot casting steps were conducted just as was described in the preceding examples. Once again no difficulty was experienced during the arc melting step and the cast ingot had a Brinell hardness number of 175.

Example 12

Another portion of a contaminated titanium metal product such as was employed in Example 1 was treated with an aqueous solution containing approximately 15% nitric acid. After treatment, the titanium metal was removed from the acid leaching solution, washed with water and dried. The titanium metal product was then arc melted and subsequently cast into ingot form. The titanium metal was ductile. Again during the arc melting operation there was no difficulty in maintaining a stable arc and there was practically no spattering of the titanium metal as it was being melted.

Example 13

Contaminated titanium metal of the type used in the preceding examples was leached with 65% nitric acid solution and substantially identical results were obtained except that the leaching operation was conducted in substantially one-half the time required for leaching the titanium metal using weaker or more dilute solutions.

Example 14

In this example contaminated titanium metal was leached with a solution containing 35% sulphuric acid and 10% sodium nitrate. Results similar to those recorded in Example 11 were obtained.

Example 15

Contaminated titanium metal was leached with 1500 parts of a solution containing 420 parts of HCl and 300 parts of $FeCl_3$. This solution is equal to about 28% HCl and 20% $FeCl_3$. Again good quality metal was obtained after a subsequent satisfactory arc melting operation.

Example 16

Another portion of the impure titanium metal was subjected to an acidic leaching operation. The acidic leaching solution in this example consisted of 1500 parts of solution containing 75 parts $H_2SO_4$ and 75 parts $FeCl_3$. These amounts correspond to a concentration of about 5% $H_2SO_4$ and about 5.0% $FeCl_3$. Once again no difficulty was experienced during the arc melting step, and the cast ingot had a Brinell hardness number of 204.

Example 17

Still another portion of the impure titanium metal employed in the preceding examples was subjected to a leaching operation in order to remove the contaminating magnesium metal and magnesium chloride. This time the leaching solution consisted of 1500 parts of a 15% ferric chloride solution. This leaching solution was sufficiently acidic to attack the magnesium metal and thus remove it from the titanium metal product. The separated titanium metal product was subsequently washed and dried and was then processed by an arc melting operation, and the arc proved to be very stable. The titanium metal ingot which was formed possessed a Brinell hardness of 210.

Similar results to those described in the above examples also were obtained using ozone, bromide and $Na_2CrO_4$, chromic acid, $MnO_2$, $PbO_2$, $NaClO_4$, $NaClO$, $KBrO_3$, and $CuSO_4$.

For comparative purposes and in order to illustrate the effectiveness of the instant invention two other portions of the impure titanium metal product employed in Example 1 was subjected to leaching operations in which one portion was treated with the same amount of sulfuric acid leaching solution as was employed in Example 1 and the other portion was treated with the same amount of hydrochloric acid leaching solution as was employed in Example 10. However, no oxidizing agent was employed in either case. Although apparently the contaminants, including magnesium metal and magnesium chloride were removed in both leaching operations the titanium metal product could not be suitably employed in a subsequent arc melting operation inasmuch as there was excessive spattering of the titanium metal, and furthermore, it proved impossible to maintain a stable arc during the melting operation.

It has clearly been demonstrated by the examples presented and by the preceding description that according to the process of the instant invention, it is possible to effectively remove contaminants such as, for example, magnesium metal and magnesium chloride from titanium metal by a leaching operation in which the acidic leaching solution contains an oxidizing agent. The products resulting from such leaching step are particularly amenable to a subsequent arc melting operation. Furthermore, it has been shown that it is possible to accomplish such removal by a leaching operation which is simple and economical to employ and which does not require complex equipment or large amounts of additional purifying agents.

As set out above, the instant application is a continuation-in-part of our applications Serial Nos. 365,776, 365,777 and 365,778, all of which were filed July 2, 1953, and expressly abandoned on April 27, 1955; application Serial No. 365,776 being a continuation-in-part of an earlier application Serial No. 297,996 filed July 9, 1952, now abandoned; application Serial No. 365,777 being a continuation-in-part of an earlier application Serial No. 293,660 filed June 14, 1952, now abandoned; and application Serial No. 365,778 being a continuation-in-part of an application Serial No. 326,352 filed December 16, 1952, now abandoned.

While this invention has been described and illustrated by the examples shown, it is not intended to be strictly limited thereto and other modifications may be employed within the scope of the following claims.

We claim:

1. A process for removing the reaction byproducts from crude unleached titanium metal produced by reduction from its halide and for preventing absorption of hydrogen in the titanium metal product during removal of said reaction byproducts which comprises admixing said crude metal with an oxidizing acidic solution to solubilize the reaction byproducts from said metal and separating said solution containing the solubilized reaction byproducts from said titanium metal, said oxidizing acid solution capable of oxidizing hydrogen gas to hydrogen ion.

2. A process for removing the reaction byproducts from crude unleached titanium metal produced by reduction from its halide and for preventing absorption of hydrogen in the titanium metal product during removal of said reaction byproducts which comprises admixing said crude metal with an oxidizing acidic solution to solubilize the reaction byproducts from said metal and separating said solution containing the solubilized reaction byproducts from said titanium metal, said oxidizing acid solution selected from the group consisting of: nitric acid, an acid solution containing a salt selected from the group consisting of nitrate and ferric iron, and an acid solution containing a gas dissolved therein selected from the group consisting of chlorine and oxygen.

3. A process for removing the reaction byproducts from crude unleached titanium metal produced by reduction from its halide and for preventing absorption of hydrogen in the titanium metal product during removal of said reaction byproducts which comprises admixing said crude metal with an oxidizing acidic solution to solubilize the reaction byproducts from said metal and separating said solution containing the solubilized reaction byproducts from said titanium metal and washing said titanium metal product, said oxidizing acid solution selected from the group consisting of: nitric acid, an acid solution containing a salt selected from the group consisting of nitrate and ferric iron, and an acid solution containing a gas dissolved therein selected from the group consisting of chlorine and oxygen.

4. Method according to claim 2 in which said oxidizing acid solution is nitric acid.

5. Method according to claim 2 in which said oxidizing acid solution contains sodium nitrate.

6. Method according to claim 2 in which said oxidizing acid solution contains ferric chloride.

7. Method according to claim 2 in which said oxidizing acid solution contains chlorine gas.

8. Method according to claim 2 in which said oxidizing acid solution contains oxygen gas.

References Cited in the file of this patent

UNITED STATES PATENTS

| 1,602,542 | Marden | Oct. 12, 1926 |
| 1,814,719 | Marden et al. | July 14, 1931 |
| 2,274,237 | Jaeger et al. | Feb. 24, 1942 |
| 2,299,228 | Gray et al. | Oct. 20, 1942 |
| 2,546,933 | Steahly et al. | Mar. 27, 1951 |
| 2,697,660 | Sibert | Dec. 21, 1954 |

OTHER REFERENCES

American Inst. of Mining and Metallurgical Engineers, Technical Publication No. 1961 (1946), pages 5, 7 and 8.

Systematic Inorganic Chemistry, by Caven et al., 6th ed., published in 1946 by Blackie & Son Ltd., London. Pages 142, 143, 147 and 148.

Titanium, Report of Symposium, pub. December 16, 1948, by Office of Naval Research, D. C., page 81.

Product Engineering, vol. 20, No. 11, November 1949, page 142.

A Dictionary of Chemical Equations, by Gilman; pub. in 1950 by Electric Publishers, Chicago; page 80.

The Making, Shaping and Treating of Steel, by Camp et al., 6th ed., published in 1951 by U. S. Steel Co., Pittsburgh, Pa., page 879.

Inorganic Chemistry, by Moeller, pub. in 1952 by John Wiley & Sons, Inc., New York, pages 411–412.